United States Patent [19]

Ishi

[11] Patent Number: 5,800,935
[45] Date of Patent: Sep. 1, 1998

[54] MAGNETORESISTIVE HEAD

[75] Inventor: Tsutomu Ishi, Tokyo, Japan

[73] Assignee: NEC Corporation, Tokyo, Japan

[21] Appl. No.: 806,690

[22] Filed: Feb. 26, 1997

[30] Foreign Application Priority Data

Feb. 27, 1996 [JP] Japan ............ 8-039327

[51] Int. Cl.$^6$ .................................. G11B 5/66
[52] U.S. Cl. .......... 428/692; 428/694 T; 428/694 R; 428/694 TS; 428/694 TM; 428/900
[58] Field of Search ............. 428/692, 694 T, 428/694 TS, 694 TM, 694 R, 900; 360/113, 128

[56] References Cited

U.S. PATENT DOCUMENTS

| 5,521,005 | 5/1996 | Kitada | 428/332 |
| 5,549,977 | 8/1996 | Jin | 428/692 |
| 5,549,978 | 8/1996 | Iwasaki | 428/692 |
| 5,556,718 | 9/1996 | Motomura | 428/694 R |
| 5,576,098 | 11/1996 | Arimoto | 428/332 |
| 5,609,971 | 3/1997 | Matono | 428/692 |

FOREIGN PATENT DOCUMENTS

| 60-159518 | 10/1985 | Japan . |
| 3-54713 | 3/1991 | Japan . |
| 7-60498 | 6/1995 | Japan . |

OTHER PUBLICATIONS

Ternary NiFeX as soft biasing film in a magnetorisitive sensor; Mao–Min Chen; J. Appl. Phys. 69(8), Apr. 15, 1991, pp. 5631–5633.

*Primary Examiner*—Leszek Kiliman

[57] ABSTRACT

In a magnetoresistive head, a magnetoresistive layer 6 detects a magnetic field signal from a magnetic recording medium on the basis of resistance changes, a soft magnetic bias layer 4 applies a transverse bias magnetic field to the magnetoresistive layer 6, a longitudinal bias layer 7 applies a longitudinal bias magnetic field to the magnetoresistive layer 6, a lead layer 8 supplies a sense current to the magnetoresistive layer 6, and the product of the saturation flux density of the soft magnetic layer and the resistivity thereof is 80 [T·Ωcm] or above.

6 Claims, 8 Drawing Sheets

| SAMPLE No. | SATURATION FLUX DENSITY (T) | RESISTIVITY (μΩcm) | PRODUCT OF SATURATION FLUX DENSITY AND RESISTIVITY (T·μΩcm) | FILM THICKNESS (nm) |
|---|---|---|---|---|
| 1 | 0.31 | 130 | 40 | 33.9 |
| 2 | 0.46 | 130 | 60 | 22.8 |
| 3 | 0.62 | 130 | 80 | 16.9 |
| 4 | 0.71 | 140 | 100 | 14.8 |
| 5 | 0.86 | 140 | 120 | 12.2 |

| SAMPLE No. | SATURATION FLUX DENSITY (T) | RESISTIVITY (μΩcm) | PRODUCT OF SATURATION FLUX DENSITY AND RESISTIVITY (T·μΩcm) | FILM THICKNESS (nm) |
|---|---|---|---|---|
| 6 | 1.17 | 30 | 35 | 9.0 |
| 7 | 1.00 | 60 | 60 | 10.5 |
| 8 | 0.80 | 100 | 80 | 13.1 |
| 9 | 0.61 | 140 | 85 | 17.2 |
| 10 | 0.31 | 160 | 50 | 33.9 |

| SAMPLE No. | SATURATION FLUX DENSITY (T) | RESISTIVITY (μΩcm) | PRODUCT OF SATURATION FLUX DENSITY AND RESISTIVITY (T·μΩcm) | FILM THICKNESS (nm) |
|---|---|---|---|---|
| 11 | 0.31 | 130 | 40 | 33.9 |
| 12 | 0.46 | 130 | 60 | 22.8 |
| 13 | 0.62 | 130 | 80 | 16.9 |
| 14 | 0.71 | 140 | 100 | 14.8 |
| 15 | 0.86 | 140 | 120 | 12.2 |

FIG. 8

MAGNETORESISTIVE HEAD

BACKGROUND OF THE INVENTION

The present invention relates to a magnetoresistive head for reading out data from magnetic recording media.

Fabrication of thin film magnetic heads have resort to thin film formation techniques and photolithographic techniques. Specifically, a fine magnetic circuit is formed on a substrate by using these techniques, followed by mechanical finishing. Such thin film magnetic heads are one of essential techniques indispensable for increasing the recording density of recent magnetic recorders such as magnetic disc recorders and magnetic tape recorders. Especially, magnetoresistive (MR) heads for reading only, utilizing the magnetoresistive effect, are a key to promote the size reduction and capacity increase of hard magnetic disc devices.

The capacity increase of a hard magnetic disc device would essentially require increasing the data recording track density, which in turn requires reducing the track width of the MR head. The read output of the MR head, however, is proportional to the read track width, and the track width reduction would reduce the output.

In order to be able to always provide a read output at a fixed level irrespective of track width reduction, it is conceivable to increase the MR head sense current. Increasing the MR head sense current, however, may lead to a temperature increase of the MR element (magnetoresistive element) due to Joule heat generation. Deterioration of the MR head due to the temperature rises results in variations of the resistance value and resistance change ratio of the MR element, magnetic property changes of a bias film for providing an optimum element bias state, thermal stress generation, and so forth. In practice, it should be taken into most critical consideration that the accelerated electromigration reduces the life of the MR element. By way of example, it is estimated that when the element temperature is increased to about 30° C. above the ambient temperature, the life of the MR element up to an inter-connection breakage due to the electromigration is reduced to one tenth or below compared to the case free from temperature rise.

Another conceivable method is to increase the sense current utility factor without greatly changing sense current itself. An MR element usually comprises a laminate structure which includes a magnetoresistive layer (MR layer) for detecting a magnetic field signal from a magnetic recording medium by utilizing resistance changes, a soft magnetic bias layer (SAL) for applying a transverse bias field to the MR layer to make magnetoresistive changes to be a linear response to the medium field, and a magnetic separation layer for magnetically separating the MR and SAL. The sense current is distributed to these layers in dependence on the resistivities of track regions (or field sensitive regions) of these layers. Where the resistances of the track regions of the SAL and magnetic separation layers are low compared to that of the MR layer, less sense current flows through the MR layer. Less sense current in the MR layer would result in a large read output loss in the MR head with the same sense current, because the read output of the MR head is proportional to the sense current in the MR layer. For MR head read output loss reduction with a fixed sense current, it would thus be effective to increase the ratio of sense current in the MR layer, i.e., increase the coefficient of utility of the sense current.

Japanese Laid-Open Utility Model Publication No. 60-159518 discloses a structure using non-crystalline soft magnetic layer as the SAL, as a measure for increasing the sense current ratio in the MR layer. Japanese Laid-Open Patent Publication No. 3-054713, on the other hand, discloses a structure with a SAL which is formed as a laminate of Fe or an alloy mainly composed of Fe and $SiO_2$ or an insulator mainly composed of $SiO_2$. In either case, an MR head with a high sense current ratio in the MR layer and a high sense current utility coefficient, can be obtained owing to extremely high resistivity of the SAL compared to the resistivity of the MR layer.

In the above two prior art techniques, the resistivity of the material of the SAL is taken into account in increasing the resistance of the track region of the SAL. In an actual MR head design, however, the product of the saturation magnetic flux density and the thickness of the SAL is an important parameter in the application of a suitable transverse bias to the MR layer. As an example, as described in Japanese Patent Publication No. 7-60498, it is desirable to set the product of the saturation flux density and thickness of the SAL between 60% and 90% of the product of the saturation flux density and thickness of the MR layer.

To satisfy this demand, a low saturation flux density material used for the SAL dictates an increased thickness of the SAL, even if it has a high resistivity characteristic. In other words, a high resistivity characteristic of the SAL cannot be sufficiently utilized if its saturation flux density is low, because the resistance of the track region of the SAL is proportional to the resistivity thereof, while being inversely proportional to the thickness of the layer. Heretofore, such an optimum relation between the saturation flux density of the SAL and the resistivity thereof has been taken into no account.

SUMMARY OF THE INVENTION

An object of the present invention is to provide an MR head with a high sense current utilization coefficient and suitable for track width reduction, by setting the saturation flux density and resistivity of the SAL in an optimum range.

According to one aspect of the present invention, there is provided a magnetoresistive head comprising a magnetoresistive layer for detecting a magnetic field signal from a magnetic recording medium on the basis of resistance changes, a soft magnetic bias layer for applying a transverse bias magnetic field to the magnetoresistive layer, a longitudinal bias layer for applying a longitudinal bias magnetic field to the magnetoresistive layer, and a lead layer for supplying a sense current to the magnetoresistive layer, the product of the saturation flux density of the soft magnetic layer and the resistivity thereof being 80 [T·Ωcm] or above.

The soft magnetic bias layer is of a non-crystalline material mainly composed of Co or is of a material containing Ni—Fe—M, M being at least element selected from the group consisting of Rh, Pd, Nb, Zr, Ta, Ti, Hf, Al, Pt, Au, Cr, Ir, Mo, W and Si. The longitudinal bias layer is of a hard magnetic material or is of an anti-ferromagnetic material contiguous to a ferromagnetic layer. The magnetoresistive layer and the soft magnetic bias layer are substantially equal in width to the track region (or field sensitive region) when the head is assembled in a magnetic recorder.

Other objects and features will be clarified from the following description with reference to attached drawings.

PREFERRED EMBODIMENTS OF THE INVENTION

Figure 1:
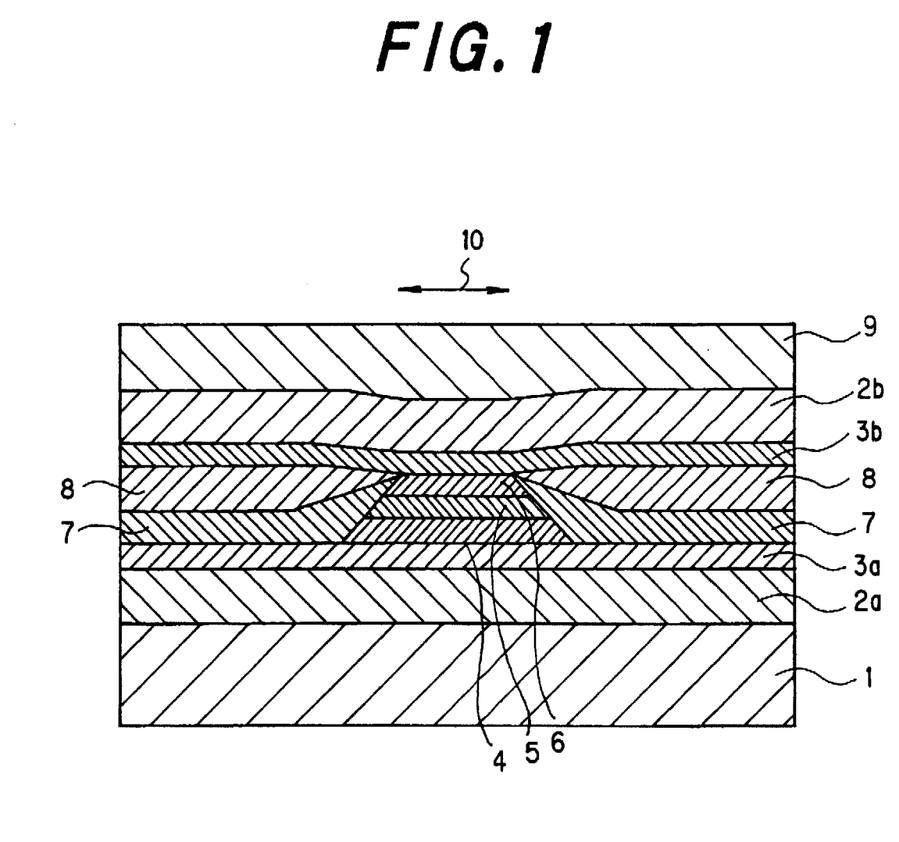
FIG. 1 is a sectional view showing an MR head as a first and a second embodiment of the present invention.

FIG. 1 is a sectional view showing an MR head as a first and a second embodiment of the present invention, taken in a plane parallel to the surface of a magnetic recording medium when the head is assembled in a magnetic recorder. In the following description, the directions perpendicular to and the leftward/rightward directions of the plane of the figure, are referred to as a transverse and a longitudinal direction, respectively.

The first embodiment of the MR head has an MR layer 6, a magnetic separation layer 5, and an SAL 4 for applying a transverse bias magnetic field to the MR layer 6, these layers being formed over a substrate 1 in a track region (or field sensitive region) 10 thereof when it is assembled in the magnetic recorder. A longitudinal bias layer 7 for applying a longitudinal bias field to the MR layer 6, is provided on the opposite sides of the layers 4 to 6. A lead layer 8 for supplying a sense current to the MR layer 6, is formed on the longitudinal bias layer 7. The structure as described is sandwiched between a pair of magnetic shield layers 2a and 2b via non-magnetic and electrically insulating gap layers 3a and 3b. Atop this structure, an overcoat layer 9 is formed.

A specific example of fabrication of the MR head according to the present invention will now be described.

Figure 2:
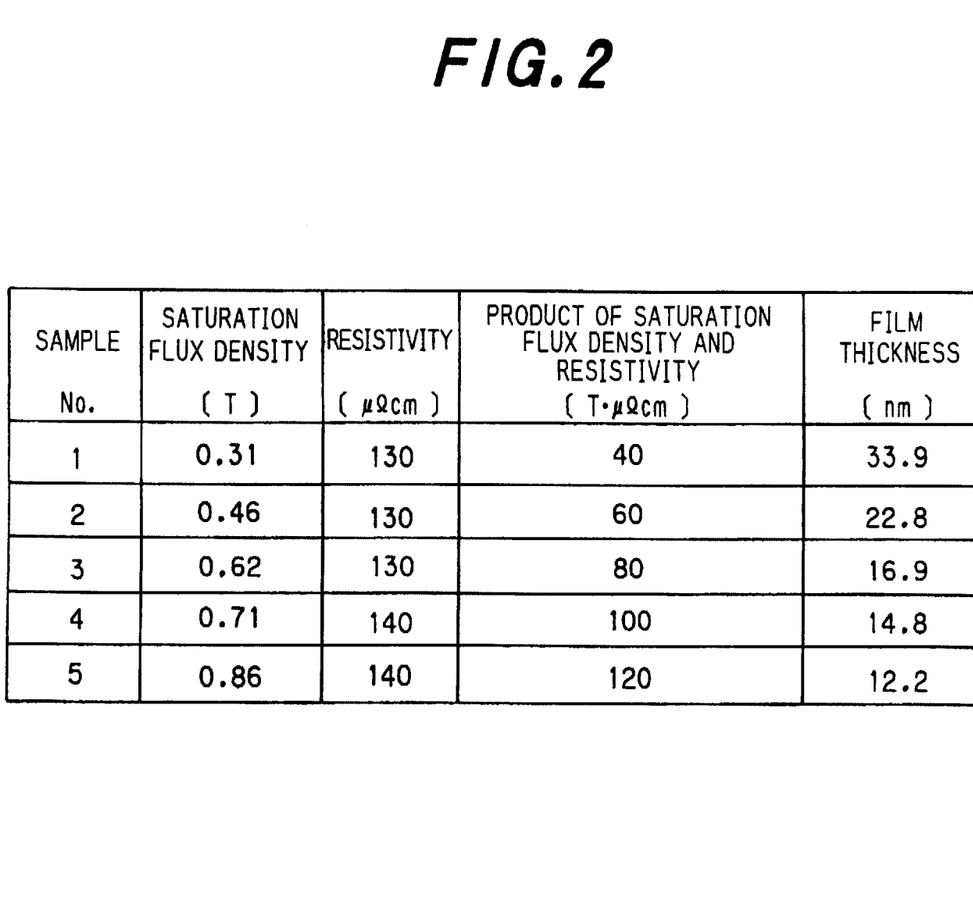
FIG. 2 is a table showing parameters about the SAL of the MR head according to a first embodiment of the present invention.

An $Al_2O_3$—TiC was used as the substrate 1, a Ni—Fe plating film 2 [μm] in thickness was formed as the magnetic shield layer 2a and were patterned by the ion mill etching. After $Al_2O_3$ 0.1 [μm] in thickness was sputtering formed as the gap layer 3a, a Co—Zr—Mo film, a Ta film 10 [nm] in thickness, and a Ni—Fe film 15 [nm] in thickness, were sputtering formed as the SAL 4, magnetic separation layer 5 and MR layer 6, respectively. The laminate as obtained above was then patterned by ion mill etching to leave it only in the track region (or field sensitive region). Five different samples of the laminate structure as described were formed by selecting different composition ratios of the Co—Zr—Mo film as the SAL film 4 as shown in FIG. 2. The thickness of the SAL 4 was controlled such that the product of the saturation flux density and thickness of the SAL 4 is 70% of the product of the saturation flux density and thickness of the MR layer 6. A Co—Cr—Pt film 25 [nm] in thickness was then sputtering formed as the longitudinal bias layer 7 on the opposite sides of the trilayer laminate. An Au film 0.15 [μm] was then sputtering formed to a predetermined shape as the lead layer 8. An $Al_2O_3$ 0.15 [μm] was then sputtering formed as the gap layer 3b again. Then, a Ni—Fe plating layer 2 [μm] in thickness was formed as the magnetic shield layer 2b. Finally, an $Al_2O_3$ film 50 [μm] in thickness was sputtering formed as the overcoat film 9. The structure thus obtained was then fed through a mechanical polishing process and a head assembling process, thus completing the fabrication of the MR head.

Figure 3:
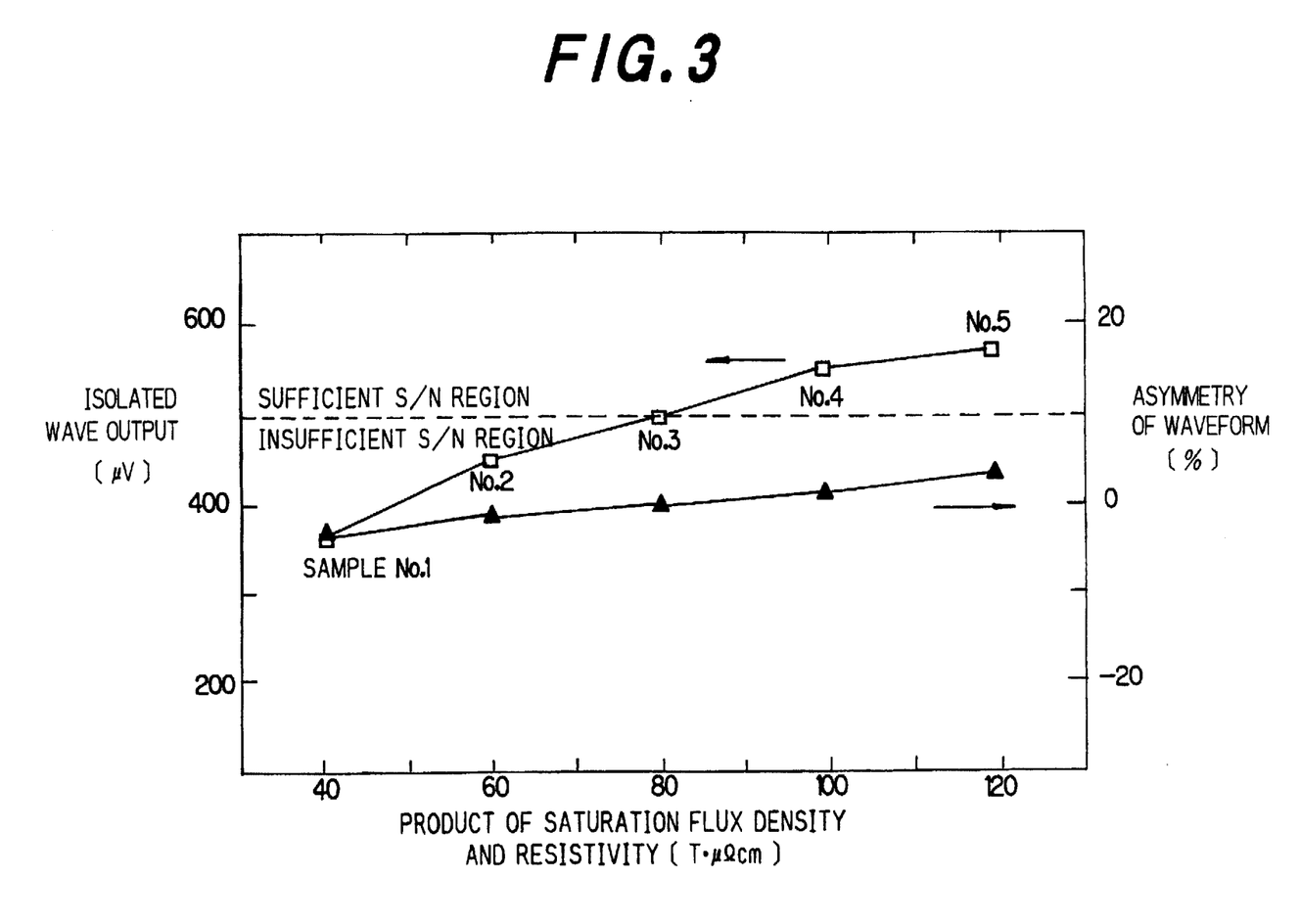
FIG. 3 shows electromagnetic conversion characteristics of the MR head according to a first embodiment of the present invention.

FIG. 3 shows electromagnetic conversion characteristics of the above samples of the MR head, measured under a condition of the same current (6 [mA]). To ensure a sufficient signal-to-noise (S/N) ratio of the MR head in the operation thereof, the isolated wave output should be 500 [μV] or above, and also the asymmetricity of the waveform should be in a range between −10 to +10%. The asymmetry of the waveform is defined as $(V_{op+} - V_{op-})/(V_{op+} + V_{op-})$. As shown in FIG. 3, the above requirements are met by samples No. 3 to No. 5 of the MR head, in which the product of the saturation flux density and resistivity of the SAL is 80 [T·μΩcm] or above. The electromagnetic conversion characteristics of these samples were excellent. This is thought to be attribute to the realization of a structure, which can increase the sense current ratio in the MR layer and the sense current utilization coefficient with the same sense current.

The second embodiment of the MR head according to the present invention will now be described with reference to FIG. 1.

Figure 4:
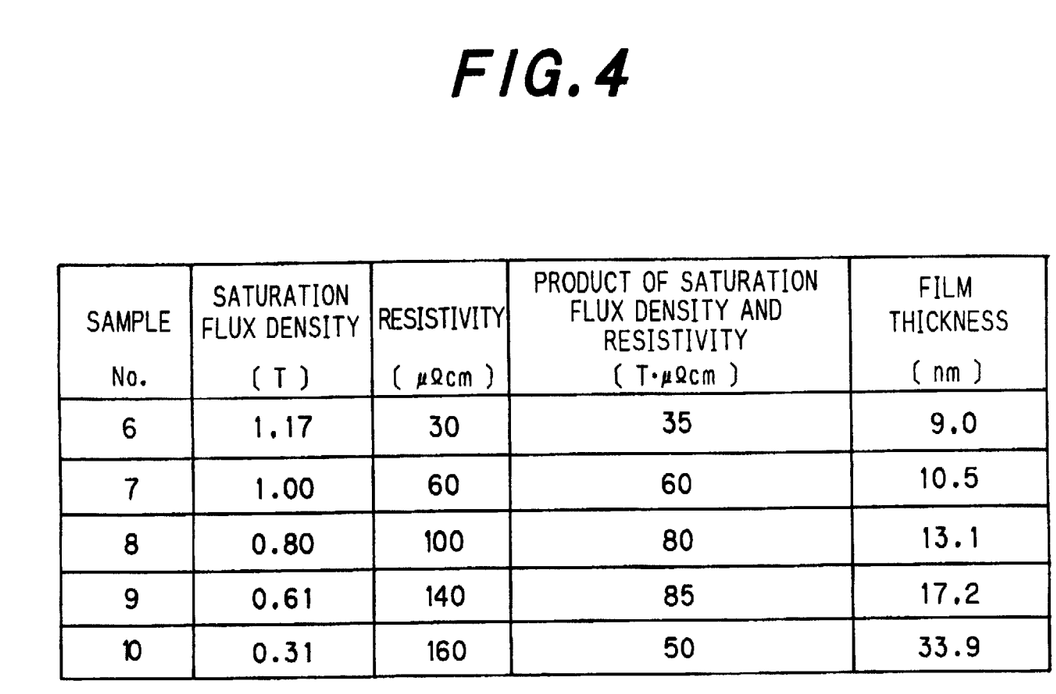
FIG. 4 is a table showing parameters about the SAL of the MR head according to a second embodiment of the present invention.

An $Al_2O_3$—TiC was used as the substrate 1, a Ni—Fe plating film 2 [μm] in thickness was formed as the magnetic shield layer 2a and were patterned by the ion mill etching. Then, after an $Al_2O_3$ 0.1 [μm] in thickness was sputtering formed as the gap layer 3a, a Ni—Fe—Nb film, a Ta film 10 [nm] in thickness, and a Ni—Fe film 15 [nm] in thickness, were sputtering formed as the SAL 4, magnetic separation layer 5 and MR layer 6, respectively. The laminate as obtained above was then patterned by ion mill etching to leave it only in the track region (or field sensitive region). Five different samples of the laminate structure as described were formed by selecting different composition ratios of Ni in the Ni—Fe—Nb film as the SAL film 4 as shown in FIG. 4. The thickness of the SAL 4 was controlled such that the product of the saturation flux density and thickness of the SAL 4 is 70% of the product of the saturation flux density and thickness of the MR layer 6. Then, the MR head was fabricated through the similar procedures of the first embodiment.

Figure 5:
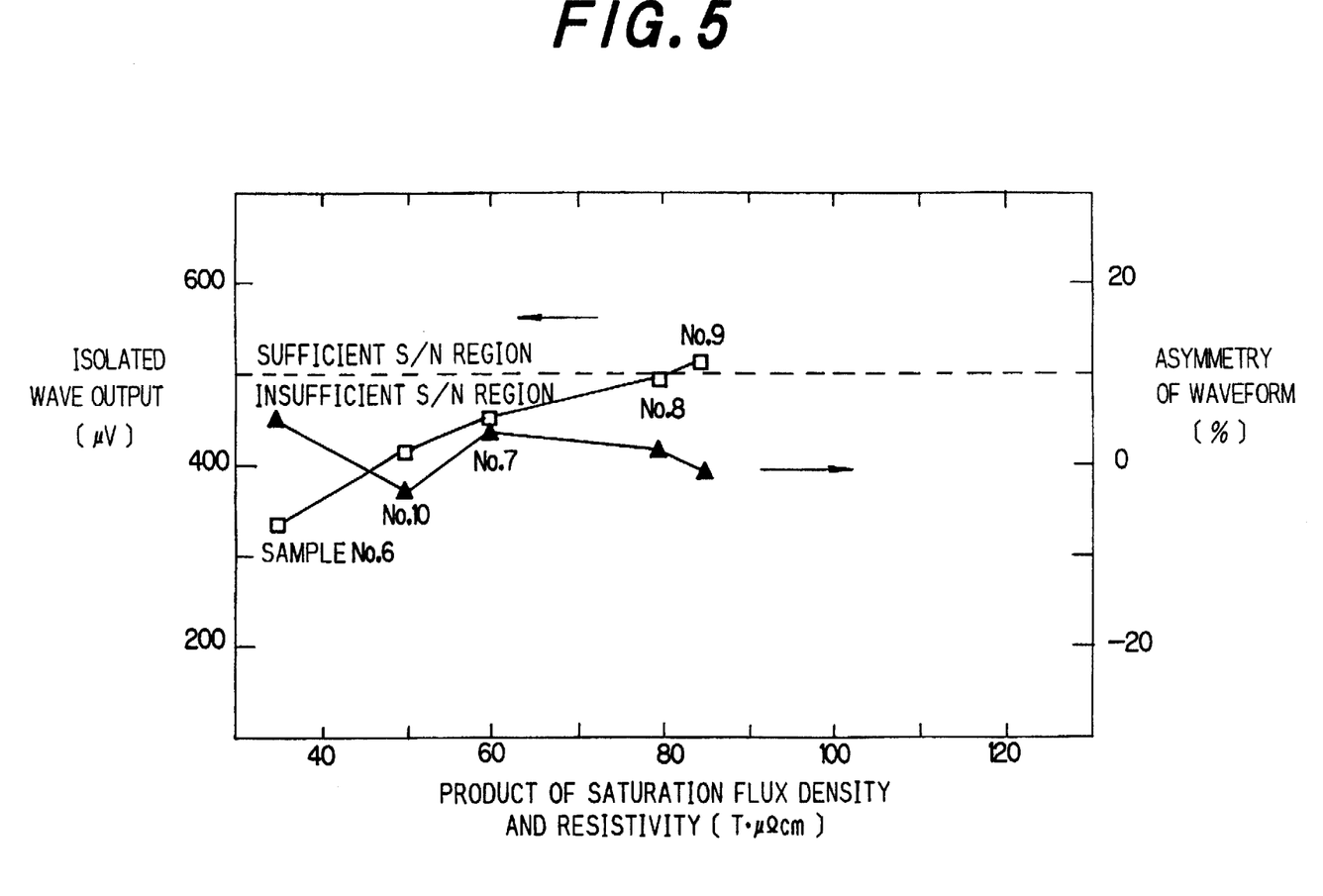
FIG. 5 shows electromagnetic conversion characteristics of the MR head according to the second embodiment of the present invention.

FIG. 5 shows electromagnetic conversion characteristics of the above samples of the MR head, measured under a condition of the same current (6 [mA]). As is shown in FIG. 5, like the previous first embodiment, the above requirement requirements are met by samples No. 8 and 9 of the MR head, in which the product of the saturation flux density and resistivity of the SAL is 80 [T·Ωcm] or above. The electromagnetic conversion characteristics of these samples were excellent such that the isolated wave output should be 500 [μV] or above, and also the asymmetry of the waveform should be in a range between −10 to +10%.

Figure 6:
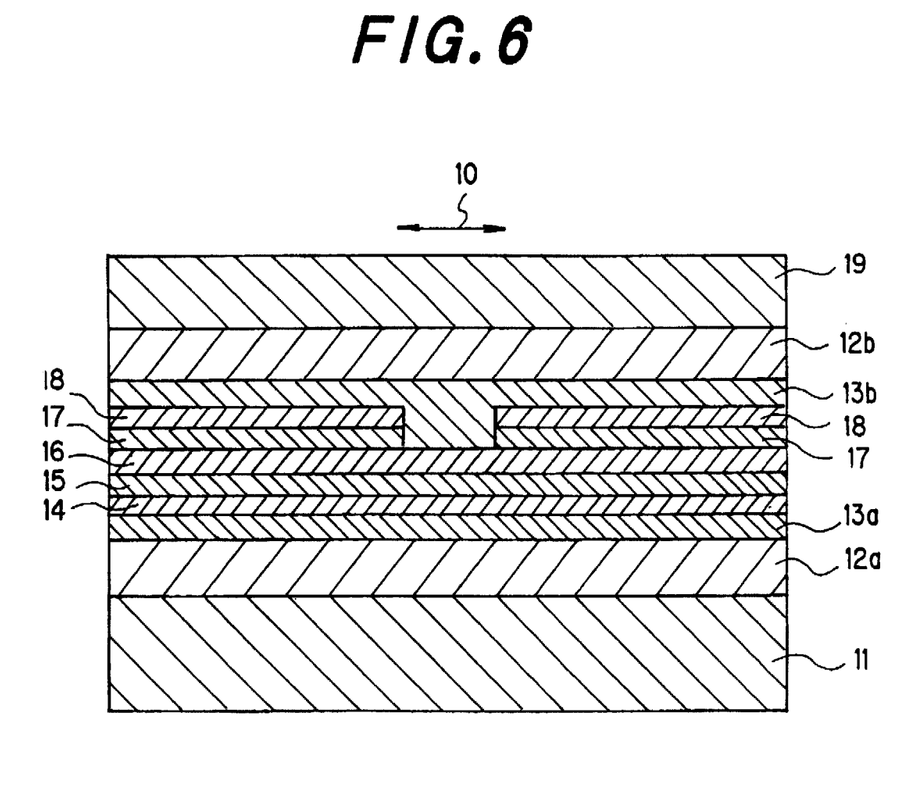
FIG. 6 is a sectional view showing an MR head as a third embodiment of the MR head according to the present invention.

FIG. 6 is a sectional view showing an MR head as a third embodiment of the MR head according to the present invention, taken in a plane parallel to the surface of a magnetic recording medium when the head is assembled in a magnetic recorder. In the following description, the directions perpendicular to and the leftward/rightward directions of the plane of the figure, are referred to as a transverse and a longitudinal direction, respectively.

This embodiment of the MR head has an MR layer 16, a magnetic separation layer 15, and an SAL 14 for applying a transverse bias field to the MR layer 16, these layers being formed on a substrate 11. On this laminate are laminated a longitudinal bias layer 17 for applying a longitudinal bias field to the MR layer 16 and a lead layer 18 for supplying a sense current to the MR layer 17. In the lead layer 18, a space is formed which has a width corresponding to a track region (or field sensitive region) 10. The structure as described is sandwiched between a pair of magnetic shield layers 12a and 12b via non-magnetic and electrically insulating layers 13a and 13b. Atop this structure, an overload layer 19 is formed.

A specific example of fabrication of the third embodiment of the MR head according to the present invention will now be described.

Figure 7:
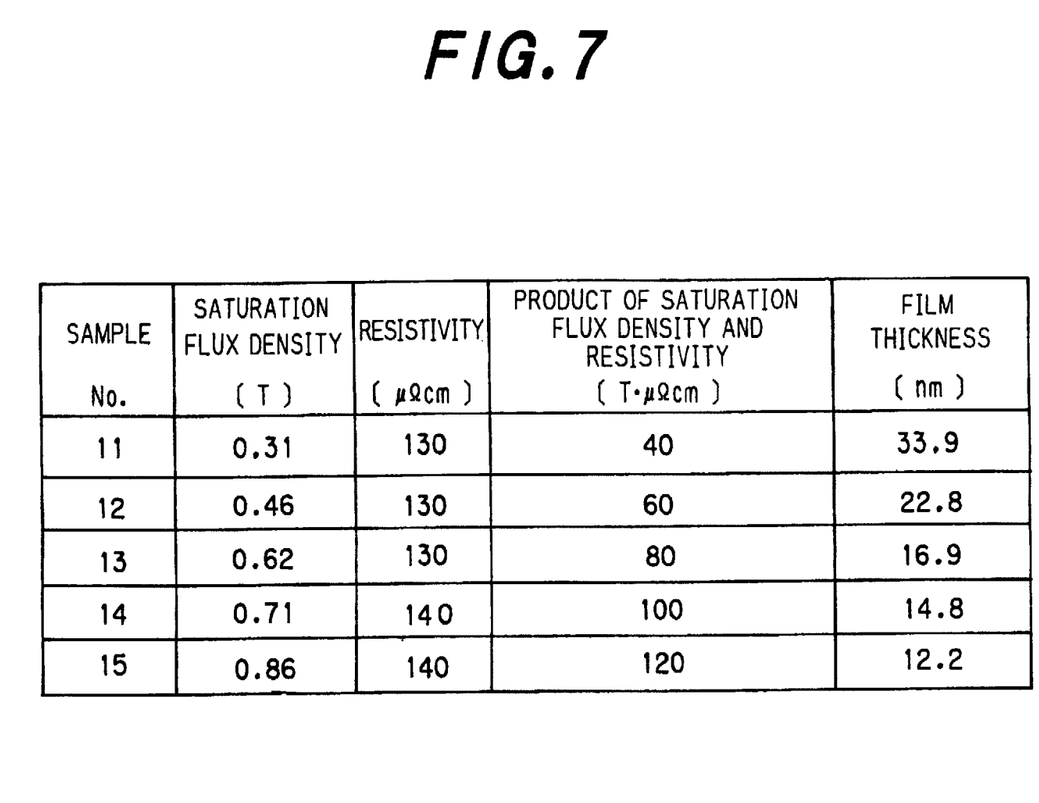
FIG. 7 is a table showing parameters about the SAL of the MR head according to the third embodiment of the present invention.

An $Al_2O_3$—TiC substrate was used as the substrate 11. A Ni—Fe film 2 [μm] in thickness was formed as the magnetic shield layer 12a. After an $Al_2O_3$ film 0.1 [μm] in thickness was sputtering formed as the gap layer 13a, a Co—Zr—Mo non-crystalline film, a Ta film 15 [nm] in thickness, and a Ni—Fe film 20 [nm] in thickness, were sputtering formed as the SAL 14, magnetic separation layer 15 and MR layer 16, respectively. Five different samples of the laminate structure as described were formed by selecting different composition ratios of Co in the Co—Zr—Mo film as the SAL film 14 as shown in FIG. 7. The thickness of the SAL 14 was controlled such that the product of the saturation flux field density and thickness of the SAL is 70% of the product of the saturation flux density and thickness of or MR layer 16. A Ni—Mn film 25 [nm] in thickness was then formed as the longitudinal bias layer 17, continuous to the above laminate. An Au layer 0.15 [μm] was then sputtering formed as the lead layer 18. The layers 17 and 18 were then patterned to a predetermined shape, thus forming the track region (or field sensitive region) 10. An $Al_2O_3$ film 0.15 [μm] in thickness was then sputtering formed as the gap layer 13b. Then, a Ni—Fe film 2 [μm] in thickness was then formed by plating as the magnetic shield layer 12b. Finally, an $Al_2O_3$ 50 [μm] in thickness was then sputtering formed as the overcoat layer 19. The structure thus obtained was then fed through a mechanical polishing process and a head assembling process, thus completing the fabrication of the MR head.

Figure 8:
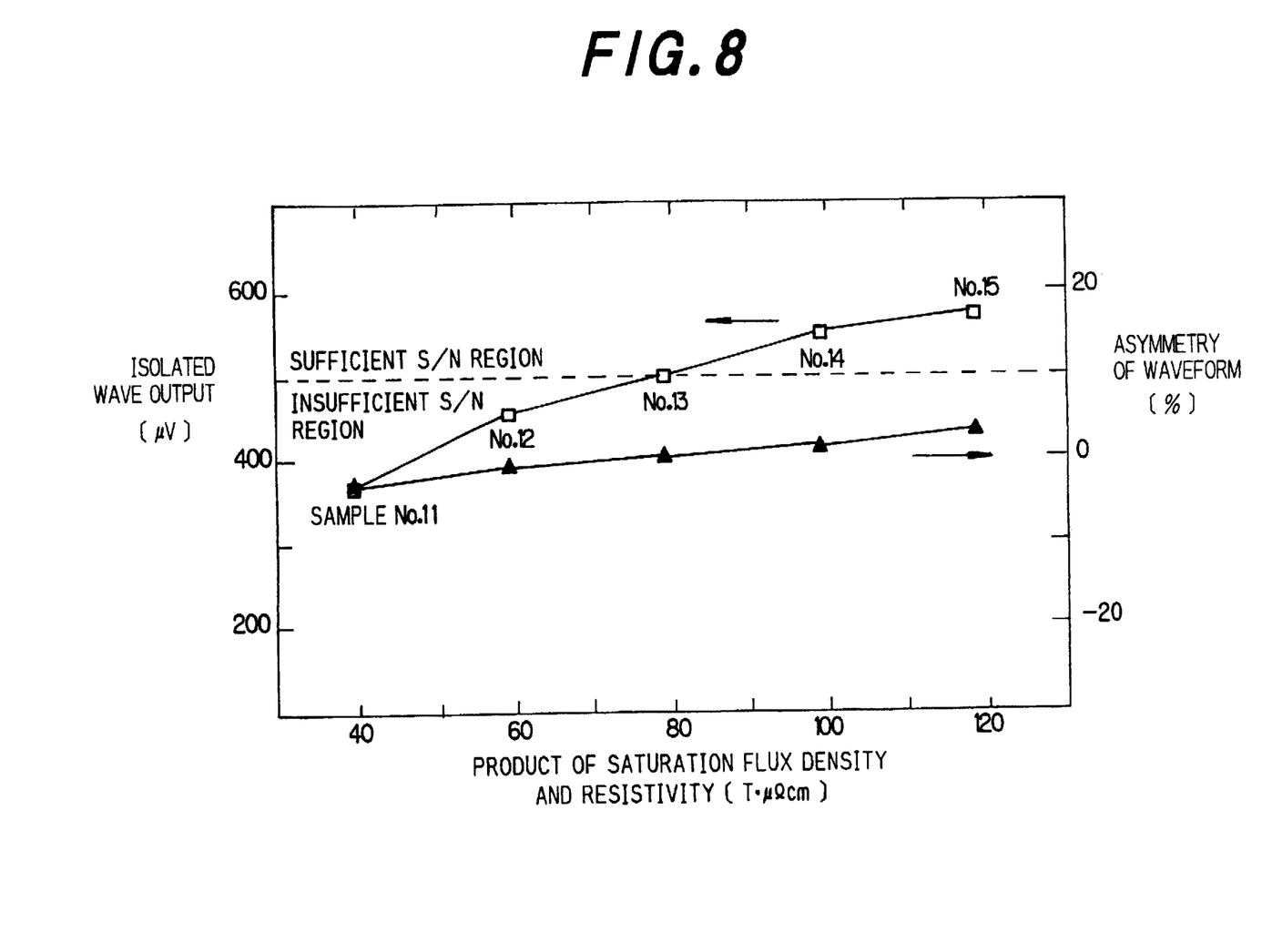
FIG. 8 shows electromagnetic conversion characteristics of the MR head according to the third embodiment of the present invention.

FIG. 8 shows electromagnetic conversion characteristics of the above samples of the MR head, measured under a condition of the same current (6 [mA]). As shown in FIG. 8, like the previous first and second embodiments, the above requirement are met by samples No. 13 to No. 15 of the MR head, in which the product of the saturation flux density and resistivity of the SAL is 80 [T·Ωcm] or above. The electromagnetic conversion characteristics of these samples were excellent, with isolated wave outputs of 500 [μV] and above and reproduced waveform asymmetricities of +10 to −10%.

In the above three embodiments, the same effects could be obtained by using Ti, Zr, W, Nb and alloys composed of two or more of these elements in lieu of Ta for the magnetic separation layer 5 or 15. Likewise, it is possible to use Ni—Fe—Co as well as Ni—Fe for the MR 6 and use Ta, W, Cu or Mo as well as Au for the lead layer 8 or 18.

It is possible to use Co—Pt, Co—Cr, Co—Cr—Ni or C—Cr—Ta as well as Co—Cr—Pt for the longitudinal bias layer 7 in the first and second embodiments. It is also possible to use a laminate film of Ni—Mn—Cr, Fe—Mn, Fe—Mn—Cr, Ir—Mn, Pd—Mn, Pt—Mn, Rh—Mn, Ni—O, Co—O, Ni—Co—O or Ni—O/Co—C as well as Ni—Mn for the longitudinal bias layer 17 in the third embodiment.

In the above three embodiments, although the product of the saturation magnetic flux density and thickness of the SAL is set 60% to 90% of the product of the saturation flux density and thickness of the MR layer, the same effects could further be obtained by setting it to 70% thereof.

The present invention is further applicable to a commonly termed MR-ID composite head, which employs a write inductive (ID) head in addition to the MR head described above. The same functions and effects are obtainable in this case.

As has been described in the foregoing, according to the present invention an MR head with a high sense current utilization coefficient and suited for track width reduction, is obtainable by the saturation flux density and the resistivity of the SAL in an optimum range.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A magnetoresistive head comprising:

a pair of magnetic shield layers formed on a substrate;

a stack including a magnetoresistive layer for detecting a magnetic field from a magnetic recording medium, a non-magnetic intermediate layer and a soft magnetic bias layer for applying a transverse bias magnetic field to said magnetoresistive layer, said stack being formed between said pair of magnetic shield layers via gap layers;

means for applying a longitudinal bias magnetic field to said magnetoresistive layer, said means for applying a longitudinal bias magnetic field being formed on the end regions of said stack;

means for applying a sense current to said magnetoresistive layer; and said means for applying a sense current being formed on said end region of said stack, the product of saturation flux density and resistivity of said soft magnetic bias layer being 80 [T·μΩcm] or above.

2. The magnetoresistive head according to claim 1, wherein said soft magnetic bias layer is of a non-crystalline material mainly composed of Co.

3. The magnetoresistive head according to claim 1 wherein said soft magnetic bias layer is of a material containing Ni—Fe—M, M being at least element selected from the group consisting of Rh, Pd, Nb, Zr, Ta, Ti, Hf, Al, Pt, Au, Cr, Ir, Mo, W and Si.

4. The magnetoresistive head according to claim 2, wherein said means for applying the longitudinal bias magnetic field to said magnetoresistive layer is of a hard magnetic material.

5. The magnetoresistive head according to claim 2, wherein said means for applying the longitudinal bias magnetic field to said magnetoresistive layer is of an antiferromagnetic material.

6. The magnetoresistive head according to claim 1, wherein said stack extends over a width substantially equal to the track region when the head is assembled in a magnetic recorder.

* * * * *